United States Patent
Crandall-Seibert et al.

(10) Patent No.: US 9,771,143 B2
(45) Date of Patent: Sep. 26, 2017

(54) SELECTOR LEVER WITH INDEPENDENT SLIDES

(71) Applicant: Hamilton Sundstrand Corporation, Windsor Locks, CT (US)

(72) Inventors: Cory M. Crandall-Seibert, Roscoe, IL (US); Andrew N. Baines, Rockton, IL (US); Timothy Michael Mayer, Belvidere, IL (US); Gary L. Voss, Bryon, IL (US); Sean Bradshaw, Rockford, IL (US); Roger F. Glenn, South Beloit, IL (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 183 days.

(21) Appl. No.: 14/494,992

(22) Filed: Sep. 24, 2014

(65) Prior Publication Data
US 2016/0083079 A1    Mar. 24, 2016

(51) Int. Cl.
*B64C 13/14* (2006.01)
*G01M 13/00* (2006.01)
*B64C 13/04* (2006.01)
*B64C 13/10* (2006.01)

(52) U.S. Cl.
CPC .............. *B64C 13/14* (2013.01); *B64C 13/04* (2013.01); *B64C 13/10* (2013.01); *G01M 13/00* (2013.01)

(58) Field of Classification Search
CPC .......... B64C 13/00; B64C 13/04; B64C 13/10; B64C 13/503; F16H 61/16; G01M 13/00; G05G 1/04; G05G 5/06
See application file for complete search history.

(56) References Cited

U.S. PATENT DOCUMENTS

| 6,804,586 B2* | 10/2004 | Richter .................. B64C 13/04 244/89 |
| 2004/0128038 A1 | 7/2004 | Richter et al. |
| 2014/0116194 A1 | 5/2014 | Nieman |
| 2015/0266564 A1* | 9/2015 | Iliescu .................... B64C 13/10 74/523 |

FOREIGN PATENT DOCUMENTS

WO    2014084809 A1    6/2014

OTHER PUBLICATIONS

EP International Search Report, International Application No. 15186717.3/1754, Date of Mailing Mar. 14, 2016, European Patent Office; International Search Report 5 pages.

* cited by examiner

*Primary Examiner* — Thomas C Diaz
(74) *Attorney, Agent, or Firm* — Cantor Colburn LLP

(57) ABSTRACT

A selector lever with redundant detent pins and detent plates and a method for using the selector lever to test for a failure of one or more detent pins. The selector lever includes at least two slides for independently moving the detent pins within the detent plates. The independent slides allow one detent pin to remain engaged. With only one detent pin engaged, the operator may test the ability to move the shaft and conclude whether or not the detent pin has failed.

5 Claims, 4 Drawing Sheets

SELECTOR LEVER WITH INDEPENDENT SLIDES

BACKGROUND OF THE INVENTION

The present disclosure relates generally to selector levers and, more particularly, to a failure detection mechanism for selector levers that may be found, for example, in the cockpit of an aircraft.

Conventional aircraft are commonly equipped with a selector lever for manually controlling the actuation of flaps, ailerons, or other moveable features of the aircraft. The selector lever is mounted in the cockpit for the pilot to select the desired equipment configuration by moving the lever to a position corresponding to the desired equipment configuration. The conventional selector lever is typically constructed with a shaft rotatably arranged adjacent one or two detent plates. One or two detent pins corresponding to the detent plates are movably arranged on the shaft. This configuration provides a measure of redundancy that allows the selector lever to be functional after one detent pin has failed. The ability to detect the failure of one or both detent pins would reduce maintenance costs and improve aircraft safety. Accordingly, the industry is receptive to new developments that provide the capability to detect the failure of a detent pin.

SUMMARY OF THE INVENTION

Disclosed herein is a selector lever having a shaft with a proximal end disposed in a housing and a distal end extending from the housing. A first slide and a second slide are arranged to be movable along the shaft. The first slide is operatively connected to a first detent pin arranged on the shaft and the second slide is operatively connected to a second detent pin arranged on the shaft. A first detent plate is disposed in the housing having a first plurality of slots for receiving the first detent pin. A second detent plate is disposed in the housing having a second plurality of slots for receiving the second detent pin.

Another aspect of the disclosure provides a method of detecting the failure of a selector lever. A first slide and a second slide are each placed in a engaged position along a shaft. The first slide is operatively connected to a first detent pin and the second slide is operatively connected to a second detent pin. The first slide is moved to a disengaged position. The ability to move the shaft is tested.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures. It is to be understood that other embodiments may be utilized and changes may be made without departing from the scope of the present disclosure. In particular, the disclosure provides various examples related to a selector lever for aircraft, whereas the advantages of the present disclosure as applied in a related field would be apparent to one having ordinary skill in the art and are considered to be within the scope of the present invention.

Figure 1:
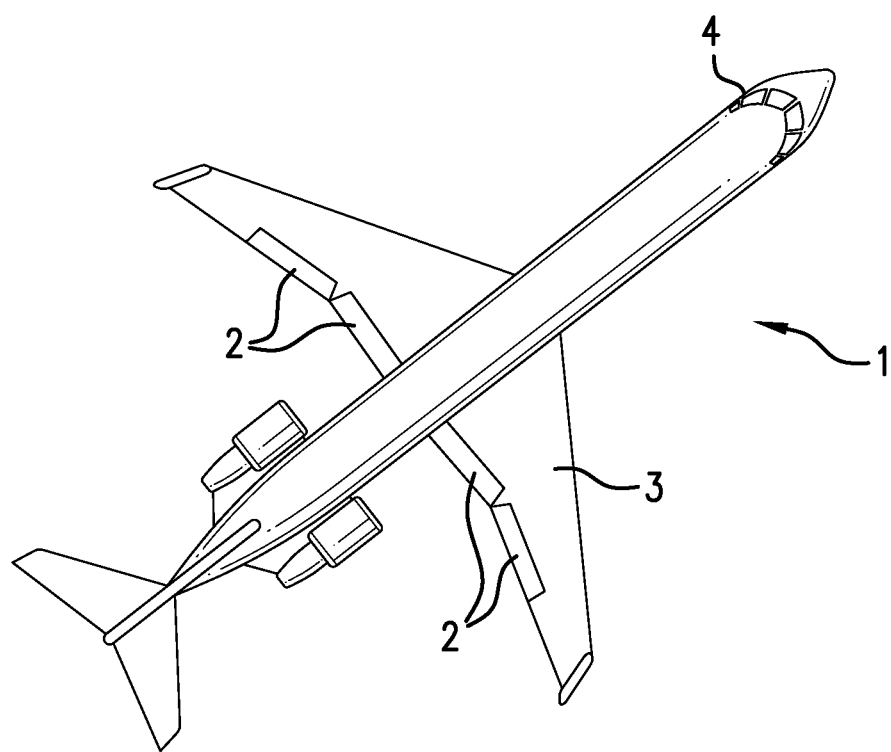
FIG. 1 is an illustration of an aircraft according to one embodiment.

FIG. 1 shows a top view of an aircraft 1 having an aircraft actuator system that employs the selector lever of the present disclosure. For example, the selector lever of the aircraft actuator system may be used to control the position of a plurality of flaps 2 located on the wings 3 of the aircraft 1. The selector lever enables the operator (or pilot) to accurately control the position of the flaps 2 from the cockpit 4. As noted above, the selector lever is contemplated to control the position of various control surfaces, such as the flaps of an aircraft. Specifically, the selector lever is contemplated to be employed in connection with one or more of the high lift surfaces associated with an aircraft. The selector lever may find other uses, in differing environments, without departing from the scope of the present disclosure.

Figure 2:
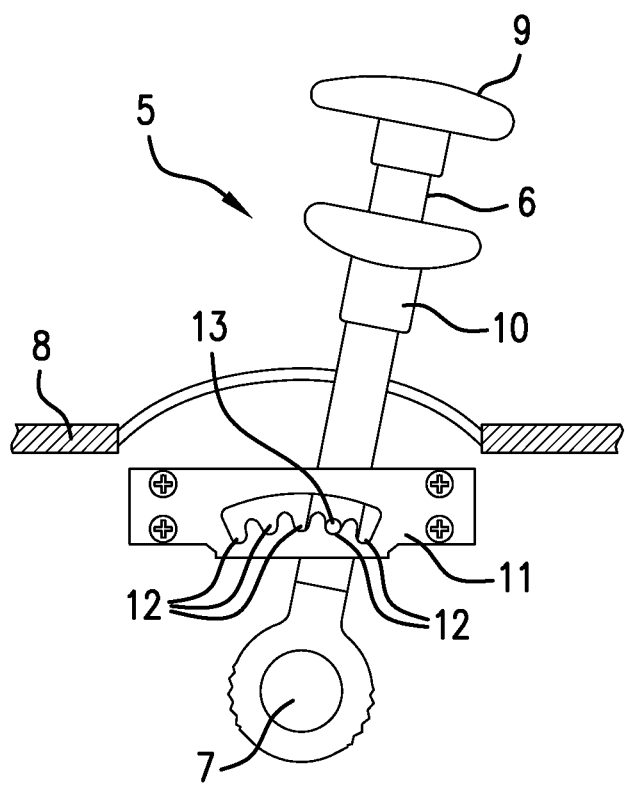
FIG. 2 is a sectioned side view of a selector lever according to one embodiment.

FIG. 2 is a sectioned side view of a hand-operated selector lever 5 according to one embodiment of the present disclosure. The selector lever 5 includes a shaft 6 having a proximal end that is rotatably attached to a pivot 7 that is disposed in a housing 8. The shaft 6 also comprises a distal end 9 that extends from the housing 8. A first slide 10 is arranged to move along the shaft 6, the first slide 10 at least partially extending from the housing 8. FIG. 2 shows a first detent plate 11 with a plurality of slots 12 disposed in the housing 8 parallel to the path of the pivoting shaft 6. FIG. 2 further shows a first detent pin 13 arranged on the shaft 6 to engage the first plurality of slots 12 of the first detent plate 11. The first detent pin 13 is operatively connected to the first slide 10 such that translational movement of the first slide 10 along the shaft results in movement of the first detent pin 13.

Figure 3:
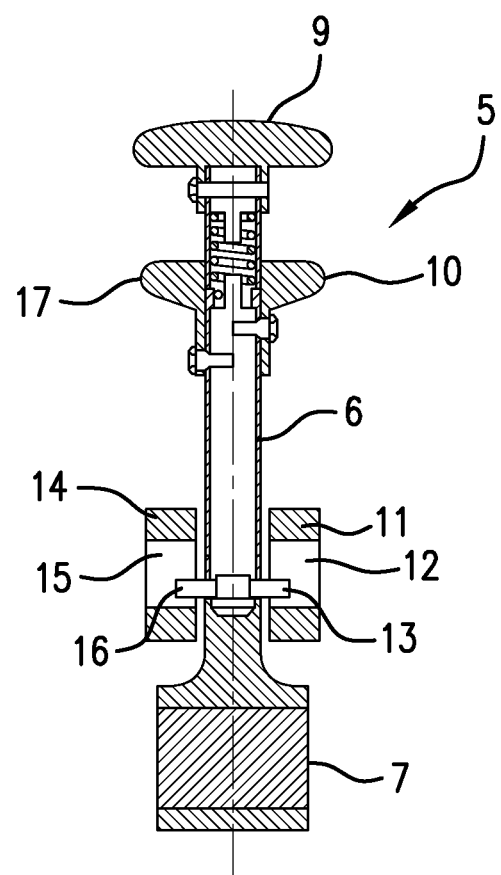
FIG. 3 is a sectioned front view of the selector lever shown in FIG. 2.

FIG. 3 shows a front view (from the left of the selector lever in FIG. 2) of the selector lever 5. As seen in FIG. 3, the selector lever 5 further comprises a second detent plate 14, (having a second plurality of slots 15), arranged opposite from the first detent plate 11. Further, a second detent pin 16 is arranged on the shaft 6 to engage the second plurality of slots 15 of the second detent plate 14, the second detent pin 13 being operatively connected to a second slide 17, the second slide capable of being operated independently from the first slide 10. The second detent plate 14 and second detent pin 16 mirror the first detent plate 11 and first detent pin 13.

Figure 4:
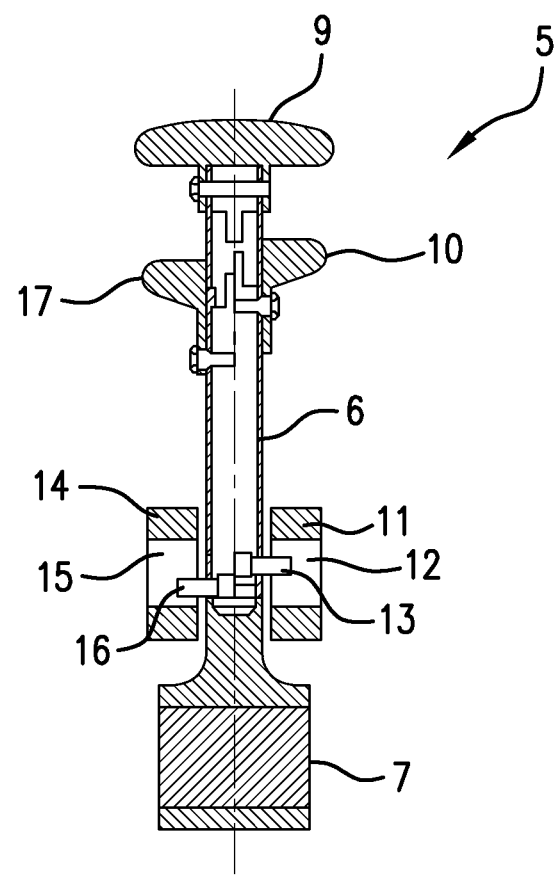
FIG. 4 is a sectioned front view of the selector lever according to another embodiment.

FIGS. 2 and 3 illustrate the selector lever 5 with the first and second slides 10, 17 in an engaged position. The "engaged position" refers to the position of the slides 10, 17 when the first and second detent pins 13, 16 are inserted into one of the first or second plurality of slots 12, 15, respectively. FIG. 4, on the other hand, shows the selector lever 5 with the second slide 17 in the engaged position and the first slide 10 in a disengaged position. The disengaged position of the slides 10, 17 refers to the position of the slide when the respective first or second detent pin 13, 16 is withdrawn from the respective slot. Where both the first and second slides 10, 17 are in the disengaged position, the shaft 6 may be rotated about the pivot 7 to a desired position of the shaft. The first and second slides 10, 17 can then be moved to the engaged position, which when at least one of the detent pins 13, 16 is intact, will effectively lock the shaft 6 in place. As shown in FIG. 3, the first and second slides 10, 17 are aligned when in the engaged position. The first and second slides 10, 17 are also aligned when in the disengaged position.

The selector lever 5 of the present disclosure may be used to test the whether the detent pins 13, 16 remain intact. The detent pins 13, 16 are tested individually, without removing the housing 8 or requiring other maintenance procedures. Normally, the selector lever 5 will be placed in a position with both the first and second slides 10, 17 arranged in an engaged position. See FIG. 3. The first and second detent pins 13, 16 will, in turn, be inserted into one of the slots 12, 15 of the respective detent plate 11, 14. One of the slides 10, 17 will then be moved to the disengaged position, as shown in FIG. 4.

In this position, the integrity of the detent pin that remains in the engaged position can be determined by testing the ability to move the shaft 6. For example, FIG. 4 shows the first slide 10 in the disengaged position. The operator tests the ability to move the shaft by exerting a force to rotate or move the shaft 6 about the pivot 7. If the appropriate force is exerted on the shaft 6 and it does not move, the operator will conclude that the opposite detent pin, in this case the second detent pin 16, is intact. This conclusion is reasonable because, with the first slide 10 in the disengaged position, the force exerted by the operator would be countered a force between the second detent pin 16 and the second detent plate 14.

The same procedure may then be used to determine the integrity of the remaining detent pin. For example, where the second detent pin 16 has been tested by the procedure described above, the same test can be performed for the first detent pin 13 with the first slide 10 in the engaged position and the second slide 17 in the disengaged position. In this manner, the operator may determine if the first detent pin 13 is intact.

The selector lever 5 may also comprise one or more biasing elements. For example, a first biasing element biases the first slide towards an engaged position and a second biasing element biases the second slide towards an engaged position.

As those in the art will ascertain, the features described above are merely exemplary and may be provided in many forms to achieve some or all of the advantages herein. In another example, the first slide 10 may be on a different side of the shaft from the first pin 13. In another example, the first and second slides 10, 17 can be coupled and decoupled from one another. In another example, the first and second slides are not aligned when both are in the engaged and/or disengaged positions.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc., do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. A selector lever, comprising:
   a unitary shaft having a proximal end disposed within a housing, the shaft having a distal end extending from the housing;
   a first slide arranged on a first side of the shaft to be movable along the unitary shaft and a second slide arranged on a second side of the shaft opposite the first side to be movable along the unitary shaft, wherein the first and second slides are movable independently from each other along the shaft;
   a first detent pin arranged on the shaft and operatively connected to the first such that translational movement of the first slide along the shaft results in movement of the first detent pin between an engaged position and a disengaged position and a second detent pin arranged on the shaft and operatively connected to the second slide such that translational movement of the second slide along the shaft results in movement of the second detent pin between an engaged position and a disengaged position;
   a first detent plate disposed in the housing and having a first plurality of slots for receiving the first detent pin; and
   a second detent plate disposed in the housing and having a second plurality of slots for receiving the second detent pin,
   wherein (i) when the first detent pin and the second detent pin are in engaged position with the respective first and second detent plates, the shaft is not movable within the housing and (ii) when the first detent pin and the second detent pin are in disengaged position with the respective first and second detent plates, the shaft is movable within the housing, and
   when the first detent pin is intact and the second slide is moved translationally such that the second detent pin is in the disengaged position and the first slide is not moved translationally, the shaft is not movable within the housing, and
   when the first detent pin is not intact and the second slide is moved transitionally such that the second detent pin is in the disengaged position and the first slide is not moved translationally, the shaft is moveable within the housing.

2. The selector lever of claim 1, the first slide and the second slide being aligned when in the engaged position.

3. The selector lever of claim 1, the proximal end of the shaft being rotatably attached to a pivot.

4. The selector lever of claim 1, the second plurality of slots in the second detent plate mirroring the first plurality of slots in the first detent plate.

5. The selector lever of claim 1, further comprising
   a first biasing element arranged to bias the first slide towards a position where the first detent pin is inserted into one of the first plurality of slots; and
   a second biasing element arranged to bias the second slide towards a position where the second detent pin is inserted into one of the second plurality of slots.

* * * * *